Jan. 17, 1933.　　　A. PASKOWSKI　　　1,894,886
MATHEMATICAL INSTRUMENT
Filed Oct. 24, 1929　　3 Sheets-Sheet 1

Inventor
Adolf Paskowski.

By Bryant & Lowry
Attorneys

Jan. 17, 1933. A. PASKOWSKI 1,894,886
MATHEMATICAL INSTRUMENT
Filed Oct. 24, 1929 3 Sheets-Sheet 2

Inventor
Adolf Paskowski.

By Bryant & Lowy
Attorneys

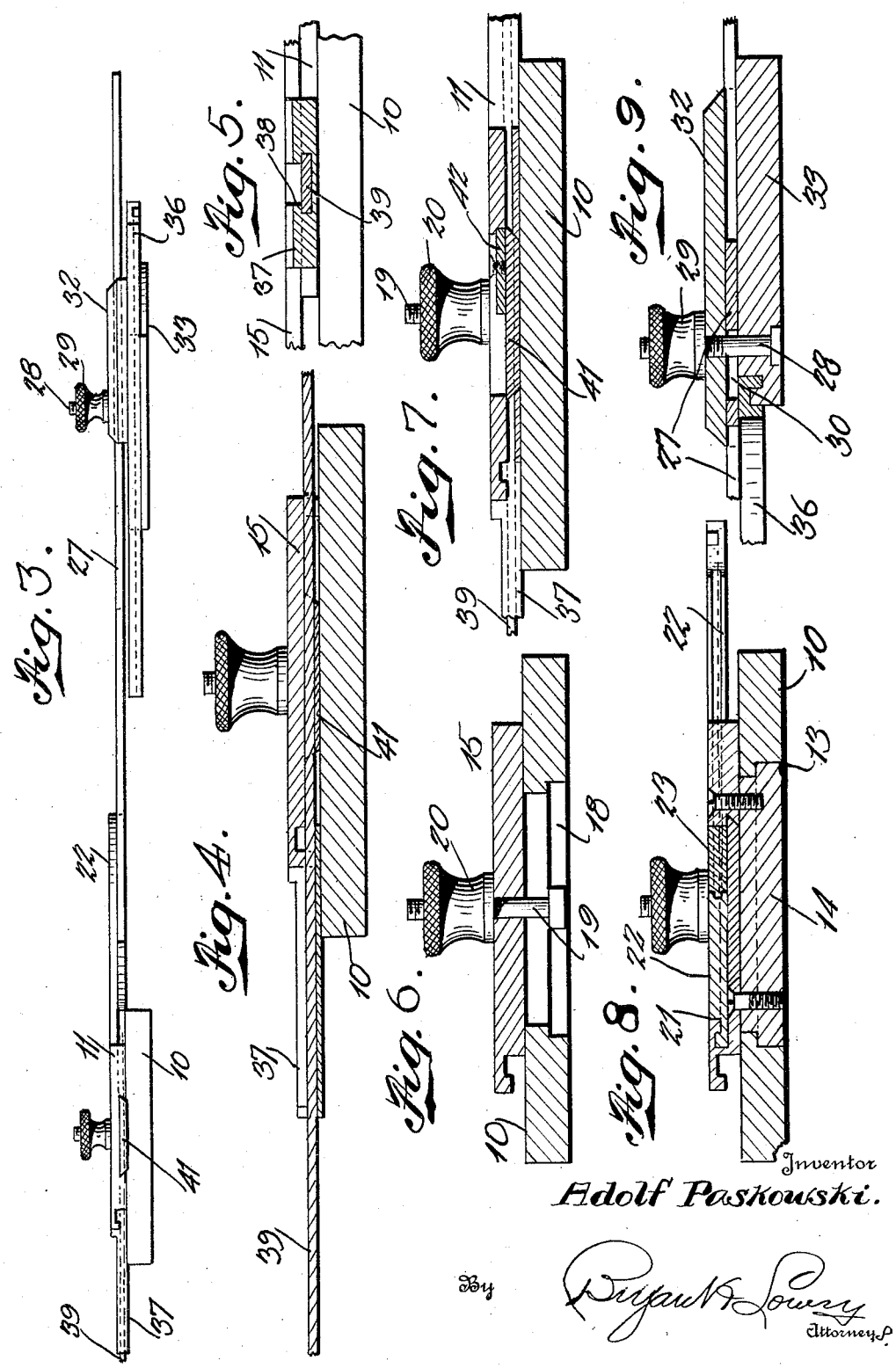

Patented Jan. 17, 1933

1,894,886

UNITED STATES PATENT OFFICE

ADOLF PASKOWSKI, OF NEW BRITAIN, CONNECTICUT

MATHEMATICAL INSTRUMENT

Application filed October 24, 1929. Serial No. 402,187.

This invention relates to mathematical instruments and has special reference to an instrument which, for the sake of convenience will be termed a combination protractor although the instrument is adapted for many other uses than are possible with an ordinary protractor.

One important object of the invention is to provide a novel and improved instrument of this kind which may be used for measuring angles, laying off squares and bevels, setting out or determining trigonometrical functions such as sines and tangents, measuring the depths of holes or bores, finding centers, as a parallel ruler for laying off parallel lines and performing a wide variety of other operations of the same general character.

A second important object of the invention is to provide an improved instrument of this class wherein certain of the operations may be performed with reference to a base line or to a line at an angle thereto without the necessity of establishing such line as a new face line.

A third important object of the invention is to provide an improved instrument of this class which, while capable of performing many different operations will yet be of simple construction, having relatively few parts and those of such nature as to be easy to operate.

With the above and other objects in view, as will be hereinafter set forth, the invention consists in general of certain novel details of construction and combinations of parts hereinafter fully described, illustrated in the accompanying drawings and specifically claimed.

In the accompanying drawings, like characters of reference indicate like parts in the several views, and:—

Figure 3 is an edge view of the instrument;

Figure 4 is a section on the line 4—4 of Figure 1;

Figure 5 is a section on the line 5—5 of Figure 1;

Figure 6 is a section on line 6—6 of Figure 1;

Figure 7 is a section on line 7—7 of Figure 1;

Figure 8 is a section on line 8—8 of Figure 1; and

Figure 9 is a section on line 9—9 of Figure 1;

Figure 1:
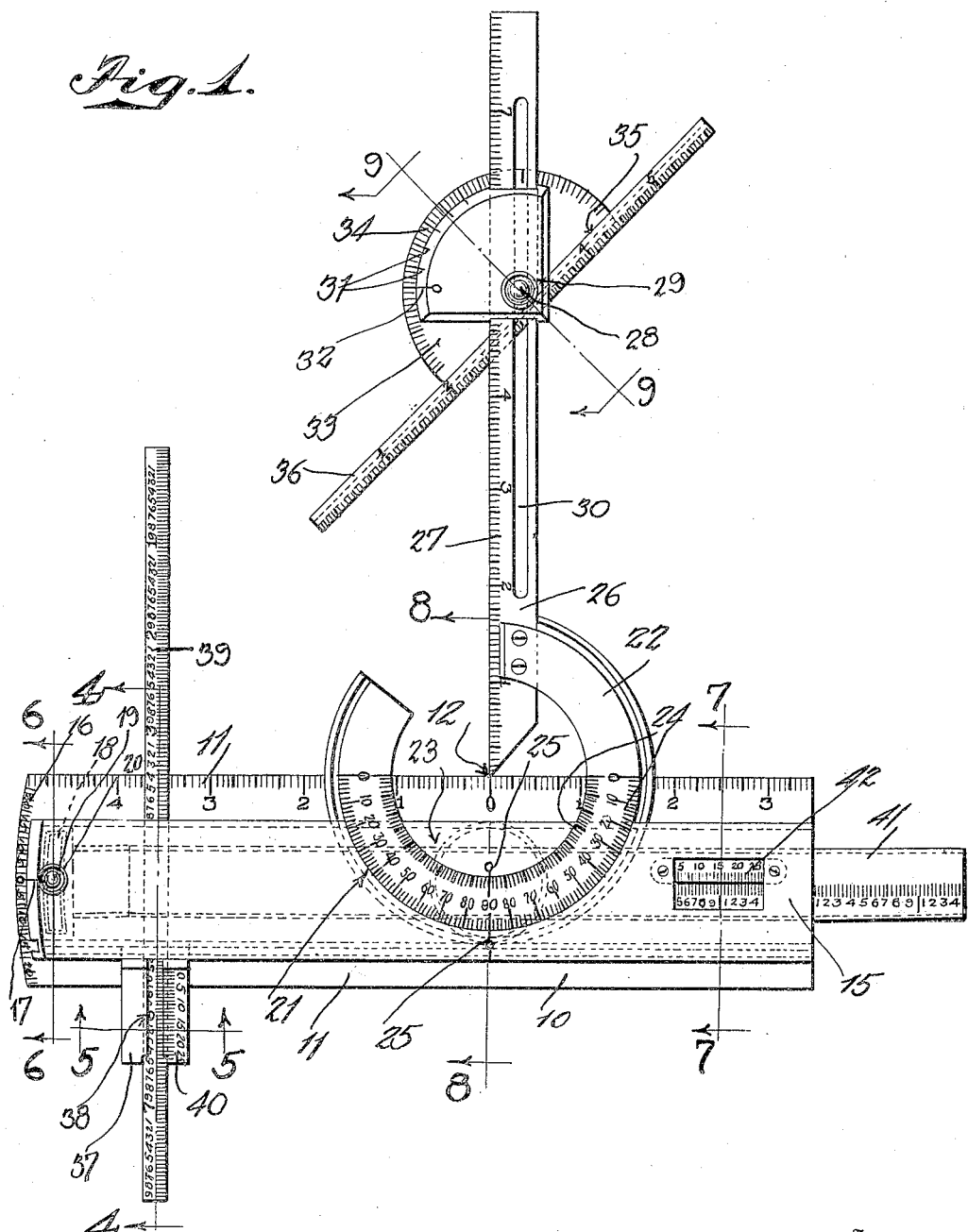
Figure 1 is a plan view of the complete instrument with the parts in one position.
Figure 2:
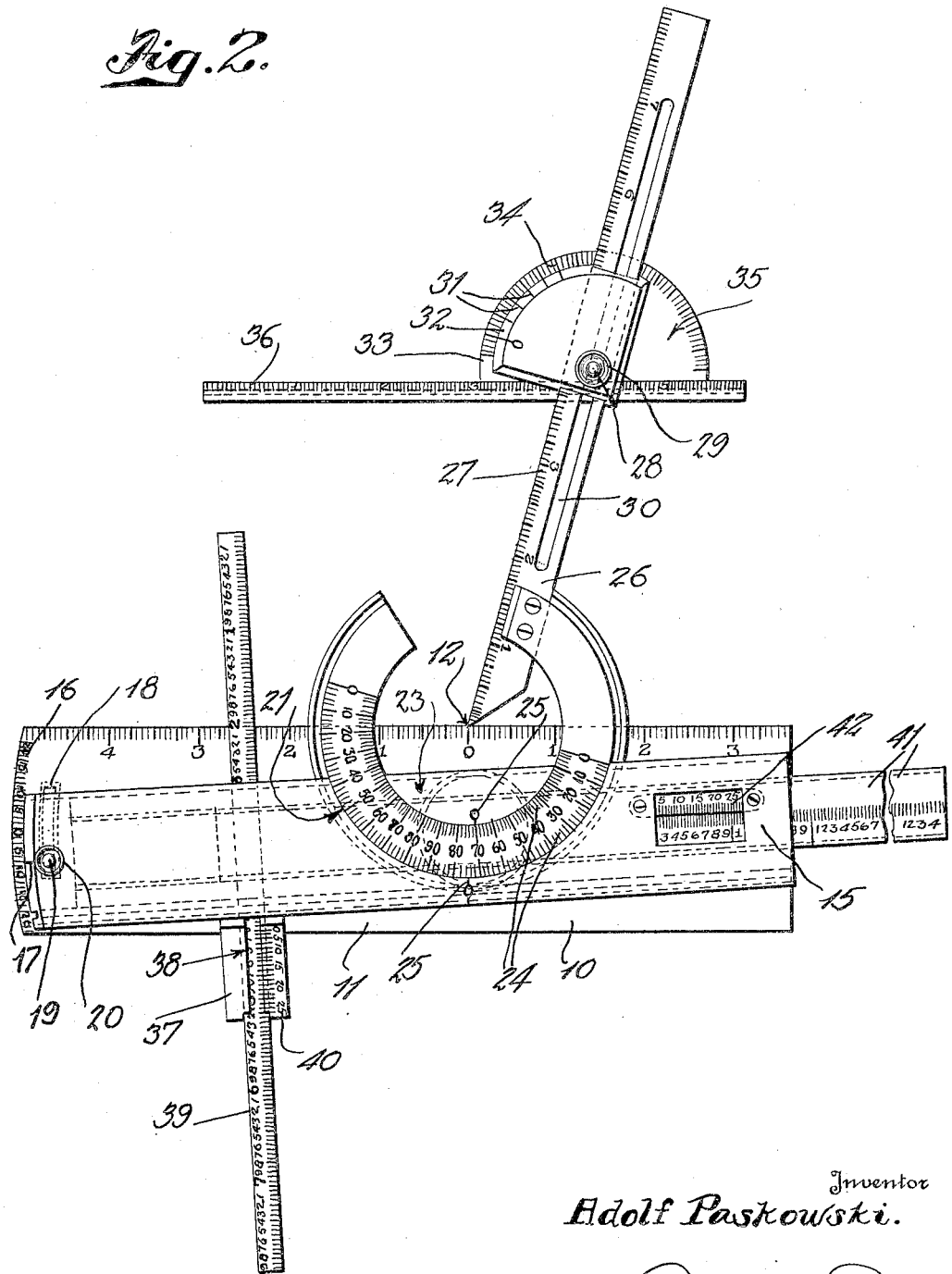
Figure 2 is a similar view showing the parts in a second position.

In the construction of the invention as here shown, there is provided a main or base member 10 having parallel side edges, one of which is provided with a scale 11 graduated both ways from a zero point 12 intermediate the ends of the scale. Opposite this zero point is a circular opening 13 having a rabetted periphery and in which fits a rabetted disk 14 and mounted intermediate its ends on this disk is a main blade 15, the blade being thus revoluble on the base member. One end edge of the main member is arcuate in form and carries degree graduations 16 and the corresponding end edge of the blade 15 is also of arcuate formation and provided with an index line 17 normally resting at the central zero point of the scale 16. These end edges are concentric with the disk 14 and in the base adjacent its arcuate edge is a rabetted slot 18 also concentric with said disk. Through the blade 15 passes a clamping bolt 19 having its head fitted in this slot 18 and provided on its upper end with a knurled binding nut 20 so that the main blade may be secured to the base in angularly adjusted position. In the edge of the blade 15 adjacent the scale 11 is formed an arcuate notch 21 undercut as shown in Figure 8 to receive the correspondingly shaped outer edge of a protractor arc 22 which is held in position by a retaining segment 23. This protractor arc is so positioned as to be concentric with the zero point 12 at the edge of the base upon the index 17 being at the zero point of the scale 16. This protractor arc extends about 135° and is graduated on its inside and outside edges as at 24, the graduations running from zero at each end to 90° in the center of such graduations. Index points 25 are engraved or otherwise indicated on the blade 15. Carried by the arc 22 is a protractor blade 26 which has a graduated edge 27 extending radially from the zero point 12 upon the index 17 being at zero. This edge lies at right angles to the graduated edge of the base upon the arc 22 being in such position that its 90° point is opposite an index 25.

Slidably mounted on the blade 27 is a slider 28 which is held in adjusted position by a bolt 29 provided with a knurled nut, the bolt passing through a slot 30 extending longitudinally of the blade. One edge of this slider is arcuate and concentric to the bolt and this edge is bevelled and provided with graduations 31 and a zero point or index 32 which lines on a radial line from the bolt center and at right angles to the edge of the blade 26. Also mounted on the bolt is a 180° protractor segment 33 having its arcuate edge graduated at 34 and concentric to the bolt 28 so that this segment may have its straight edge 35 adjusted to any desired angle with respect to the edge of the blade 26. Slidably mounted by means of a tongue and groove connection, as shown in Figure 9 on the edge 35 of the protractor segment 33 is a scale bar 36 having one edge suitably graduated. By means of this arrangement the bar 36 may be used as a parallel ruler, the angle to the slide being adjusted and the slider moved from one position to another along the blade 26. Also by proper setting of the protractor scales 24 and 34, the edge 35 may be brought to 90° to the edge of the base so that the end of the scale bar 36 may be engaged with the graduated edge of the base and, by suitably observing the ratios of the scale on said bar, scale 11 and scale 27 trigonometrical functions may be obtained. Also both right and oblique triangles may be solved by proper manipulation of these scales and protractors.

Mounted on the blade 15 to slide longitudinally thereof is a main blade slider 37 having a slot 38 extending therethrough at right angles to the main blade. In this slot slides a scale 39 suitably graduated with inches in tenths and this scale may be used as a depth gauge or for any other desired purpose. Moreover, by using this scale 39 with those previously described quadrangular figures having one right angle may be solved. That is the remaining elements may be found if certain elements be known in many cases.

In order to provide for accuracy in measuring with this scale 39 a vernier 40 is provided on the slider 37.

Slidable longitudinally of the blade 15 is a canter crossing rule or scale 41 having inches thereon depicted in tenths having a vernier 42 which may be used to determine centers.

Also, by setting the scale 36 at 45° to the base edge at the intersection of such edge and the edge of the scale 39, this scale 36 may be used to draw or scribe diametrical lines, as on the end of a round bar, to determine the center.

Obviously many other uses, too numerous to mention, will occur to those skilled in handling such instruments.

There has thus been provided a simple and efficient device of the kind described and for the purpose specified.

It is obvious that minor changes may be made in the form and construction of the invention without departing from the principles involved. It is therefore wished to include all forms, even if not here set forth, which come within the scope claimed.

Having thus described the invention, what is claimed as new is:—

1. In an instrument of the kind described, a main member having a scale at one edge extending from a zero point a blade on which said member is pivotally mounted, a protractor blade having an edge extending radially from said zero point and graduated to provide a second scale, said protractor blade being supported by the first named blade to swing on said zero point as a center, a slider on said protractor blade, a protractor segment pivotally mounted on said slider and having one straight edge, and a scale bar slidably mounted on said straight edge.

2. In an instrument of the kind described, a main member having a scale at one edge extending from a zero point a blade on which said member is pivotally mounted, a protractor blade having an edge extending radially from said zero point and graduated to provide a second scale, said protractor blade being supported by the first named blade to swing on said zero point as a center, a slider on said protractor blade, a protractor segment pivotally mounted on said slider and having one straight edge, a scale bar slidably mounted on said straight edge, and means to secure the second protractor in adjusted position on said protractor blade.

3. In an instrument of the kind described, a main member having a scale at one edge extending from a zero point a blade on which said member is pivotally mounted, a protractor blade having an edge extending radially from said zero point and graduated to provide a second scale, said protractor blade being supported by the first named blade to swing on said zero point as a center, a slider on said protractor blade, a protractor segment pivotally mounted on said slider and having one straight edge, a scale bar slidably mounted on said straight edge, the main blade being pivoted to the main member opposite the zero point of said first scale, and means to secure the main blade in adjusted angular relation to the main member.

4. In an instrument of the kind described, a main member having a scale at one edge extending from a zero point a blade on which said member is pivotally mounted, a protractor blade having an edge extending radially from said zero point and graduated to provide a second scale, said protractor blade being supported by the first named blade to swing on said zero point as a center, a slider on said protractor blade, a protractor segment pivotally mounted on said slider and having one straight edge, a scale bar slidably mounted on said straight edge, means to secure the second protractor in adjusted position on said protractor blade, the main blade being pivoted to the main member opposite the zero point of said first scale, and means to secure the main blade in adjusted angular relation to the main member.

In testimony whereof I affix my signature.

ADOLF PASKOWSKI.